United States Patent [19] [11] 3,717,798
Kahn [45] Feb. 20, 1973

[54] OVERLAY FOR OHMIC CONTACT ELECTRODES

[75] Inventor: Manfred Kahn, Williamstown, Mass.

[73] Assignee: Sprague Electric Company, North Adams, Mass.

[22] Filed: Jan. 21, 1971

[21] Appl. No.: 108,492

Related U.S. Application Data

[63] Continuation-in-part of Ser. No. 860,343, Sept. 23, 1969, abandoned.

[52] U.S. Cl.........317/234 R, 317/234 L, 317/234 M, 317/234 N
[51] Int. Cl...............................................H01l 5/00
[58] Field of Search.......................................317/234

[56] References Cited

UNITED STATES PATENTS

| | | | |
|---|---|---|---|
| 3,567,508 | 3/1971 | Cox et al. | 117/212 |
| 3,409,467 | 11/1968 | Foley | 117/217 |
| 3,544,854 | 12/1970 | Cox et al. | 317/234 |

*Primary Examiner*—John W. Huckert
*Assistant Examiner*—E. Wojciechowicz
*Attorney*—Connolly and Hutz and Vincent H. Sweeney

[57] ABSTRACT

An ohmic contact electrode is overlaid with a fritless bicomponent silver or gold composition that is alloyed or soldered so as to provide a continuous layer having low lateral resistance. The overlay is composed of a sintered mixture of metal flakes approximately one-half to one micron in size and of a very fine metal powder whose particle size is between 100–1000 A. The ohmic contact electrode is on an electrical device employing an inorganic substrate of the type having a highly electronegative element adsorbed at least on the external surface thereof. The substrate is either an insulator or a semiconductor. In ohmic or low loss contact with said substrate is at least one electrode consisting of an intimate mixture of a first metal in powdered form and selected from the group consisting of the platinum group metals, gold, silver and mixtures thereof, and a second metal being an organo compound of at least one metal selected from the group consisting of calcium, magnesium, barium, strontium, zinc, tin, vanadium, nickel, indium, titanium and chromium. The mixture is alloyed and oxidized in situ with at least some of the electronegative element of said substrate.

6 Claims, 3 Drawing Figures

OVERLAY FOR OHMIC CONTACT ELECTRODES

CROSS-REFERENCE TO RELATED APPLICATIONS

The present application is a continuation-in-part of U.S. patent application Ser. No. 860,343, filed Sept. 23, 1969 and later abandoned.

BACKGROUND OF THE INVENTION

This invention relates to an overlay for ohmic contact electrodes, and more particularly to a solderable or alloyable bicomponent silver overlay on low loss or ohmic contact electrodes and a method of making same.

It is known that when certain commonly used electrode materials are applied to semiconducting oxide bodies, the DC resistances are much larger than the true resistances of the bodies. These excess resistances are usually voltage dependent. High contact resistances at the electrode interfaces are deemed responsible for this condition and it is to a great extent the cause for unstable performance in such electrical components.

There is evidence that oxidation or adsorbed oxygen at least on the surfaces of semiconducting ceramics is responsible for some of the high series resistance. In addition, the bond made to ceramics by conventional high firing glassy electrode frits, destroys the stoichiometry of the ceramic at and under the surface and thereby creates another layer of uncertain properties. These problems were successfully solved in my pending application Ser. No. 860,343, filed Sept. 23, 1969 by employing an electrode in ohmic contact with the semiconducting ceramic of the type having at least on the surface thereof a strongly electronegative element, said electrode consisting essentially of an intimate mixture of (1) a first metal in powdered form and selected from the group consisting of the platinum group metals, gold, silver and mixtures thereof and (2) a second metal being an organo compound of at least one metal selected from the group consisting of calcium, magnesium, strontium, zinc, tin, vanadium, titanium, barium, indium, nickel and chromium. This mixture is alloyed and oxidized in-situ with at least some of the electronegative element of said substrate. However, when soldering was attempted on the alloyed electrodes made herein for the purposes of lead attachment, wetting problems were confronted. When fluxes were used to enhance solderability, the paint separated from the ceramic easily. Also, when less than 0.1 atmosphere of oxygen was used in the firing to enhance solderability, or when the samples were subjected to thermal shock, or subjected to electroless plating, adhesion decreased drastically.

Conventional glass bonded silver or gold paints wet easily with solder, but some of the electrode material always goes into solution in the solder. This is called solder burnoff, i.e., when the dissolution of the electrode material exposes so much of the glassy frit that the solder dewets from the surface.

Accordingly, it is an object of the invention to provide a low resistance ohmic contact that is adherent, that is easily solderable, even without the use of flux, that does not exhibit solder burnoff, and that is fritless.

It is a further object of the invention to provide a continuous layer having low lateral resistance on an oxide bonded ohmic contact electrode when soldered or when further alloyed with another metal, such that lead attachment is facilitated.

SUMMARY OF THE INVENTION

The solderability or alloyability of an ohmic contact electrode on a semiconducting or insulating body is facilitated by applying a fritless layer of silver or gold, that is in an organic binder, over the previously fired palladium-zinc electrodes of my pending application Ser. No. 860,343.

A bicomponent silver overlay is applied by screening a mixture of silver flake and ultrafine silver powder without the use of frit. When this mixture is heat treated at about 940° C the silver sinters and a reaction takes place between the palladium-zinc and the silver. The result is an adherent, silver colored layer, that wets completely upon immersion in liquid solder, even when no flux is used. Some silver dissolves in the solder bath, but when this takes place, it exposes the silver-palladium alloy, which is also solderable because a fresh, non-oxidized surface is exposed to the solder. Even if the electrode is left in the solder longer than necessary, a solderable surface still remains because the alloy is not very soluble in solder thereby reducing the silver burnoff problem.

As an alternative to soldering the silver surface, another alloy may be formed thereon giving a continuous layer of low lateral resistance to which members that carry current to the outside can be securely fastened.

The electrodes of the present invention may be utilized with any electrical component, e.g., capacitors, resistors, thyristors, thermistors, microcircuits, diodes, varistors, etc.

DESCRIPTION OF THE PREFERRED EMBODIMENTS

The inorganic substrate, be it an insulator or a semiconductor, that is used herein has oxygen in or on its surface. That is because either the material per se is an oxide, or it has a loosely bound or absorbed oxygen on the surface thereof. This oxygen or oxide can be combined or reacted with, or reduced by a metal having a high oxidation energy, during the firing of the electrode composition. This intimate combination of the electrode material with the surface oxygen provides an adherent bond and minimizes electrical contact losses between the electrode and the ceramic.

It is to be understood that while oxygen is probably the most common agent preventing a good contact, it is not the only such agent. For example, chlorides and sulfides on the surface of the substrate may inhibit good contact formation. Thus, in the broad sense, any substrate having on the surface thereof strongly electronegative elements, i.e., those over about 2.2 on the Electronegativity Scale (after Pauling) I, Se, C, S, Br, N, O, and F will tend to inhibit the formation of a good contact. Therefore, as employed herein, the terms "oxidation" or "oxidized form" and the like, refer to oxidation in its broader sense of involving the loss of electrons and not merely combination with oxygen..

Since there are a number of possible mechanisms by which the contacts of this invention can obtain a linear and low resistance, the constitution of the ohmic contact cannot be defined with certitude. Under the circumstances, the ohmic contact referred to herein is best defined by a reference to the essential starting materials and the fact that the alloyed mixture involved herein is in in-situ oxidized form with the electronegative element on the surface of the substrate.

Use herein of the phrase "in ohmic contact" is with recognition that the contact has a finite but low resistance, and has a linear voltage-current relationship.

Figure 1:
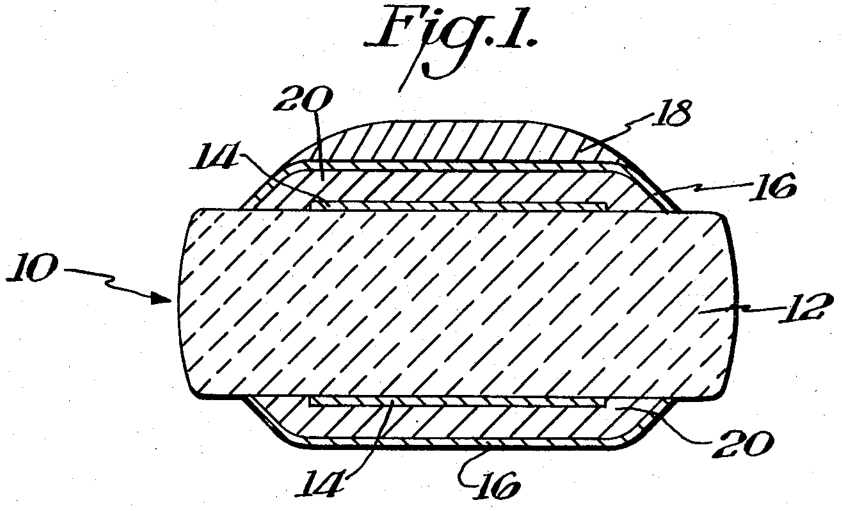
FIG. 1 shows a sectional view of a thermistor within the scope of this invention.

FIG. 1 shows a thermistor 10 having a semiconducting ceramic body 12 with electrodes 14 that are fired and then overlaid by the fritless silver mixture 16 of the present invention. When the silver overlay composition is fired, a palladium-silver alloy 20 is formed at the interface, and pure silver remains at the top surface to soldered or alloyed, as in 18. The electrodes 14 are in ohmic contact with the ceramic body 12. In a preferred embodiment of the present invention a thermistor having ohmic contacts was formed as follows: a semiconducting ceramic disc a one-half inch in diameter and 20 mils thick was formed from barium titanate doped with 0.1 weight percent $Nb_2O_5$, by mixing the niobium with powdered barium titanate and firing the unit to maturity. Electrodes formulated from a palladium-zinc alloy containing 17.5 percent zinc were applied to opposite surfaces of the semiconducting ceramic body.

This metal mixture can be applied by any one of several different techniques. By one technique, the metals are applied as a mixture of a first group metal in powdered form and said second group metal in the form of a metalorganic compound of the formula $MZ_x$, wherein M is said second group metal; Z is R, OR, SR or OCOR; R is a $C_1$–$C_{20}$ organic group and $x$ is 2–4. The mixture and the substrate are then subjected to a temperature of between about 1000°–2500°F for a time sufficient to decompose said metal-organic compound and effect oxidation of at least some of the alloyed metal by at least some of the highly electronegative element of said substrate. By another technique, the mixture of metals is applied to the substrate by the simultaneous evaporation of said metals under low pressure conditions, e.g., $10^{-3}$ torr or less, followed by firing the mixture and substrate at the above noted temperatures.

A bicomponent silver overlay metal is then applied by screening or spraying, over the previously fired palladium-zinc electrodes, a silver mixture composed of 50 percent one-half micron silver flake and 50 percent ultrafine silver oxide powder, whose particle size is between 100–1000 A. For screening purpose, enough ethocel binder in terpineol was added to obtain a suitable viscosity and silver oxide is used to obtain the ultrafine powder as a product of its reduction. A second firing is then performed at approximately 940°C. During this firing the silver oxide is reduced and a reaction takes place at the silver and palladium-zinc interface, while still retaining a solderable silver outer surface. The fired films are then dipped into molten solder and upon withdrawal they have a smooth, continuous and conductive solder coat, even when no flux is used. The resistance and the linearity of the contact to the ceramic changes very little upon solder dipping.

Other means of applying alloying materials to the silver overlay include wave soldering, application by a soldering iron, melting a preform on the surface of the silver overlay, or by conduction or convection heating.

It was found that when silver flake is used along as the silver overlay material, the silver sinters to itself early during the firing process and the resulting shrinkage causes separation of the silver film from the palladium-zinc surface. As a result, the desired silver-palladium reaction does not take place.

It was also found that when ultrafine silver powder, as derived from silver oxide powder, is used by itself there is too rapid a reaction rate between the silver and the palladium-zinc, so that no pure solderable silver is retained on the top surface of the electrode. However, I have found that the use of a mixture of the above two powder sizes produces a silver-palladium alloy at the silver-palladium interface, while retaining an adherent, silver colored outer surface that is easily solderable or alloyable.

Gold overlays can be used interchangeably with the silver producing similar desirable results. The mixture of gold used herein is similar to the silver in that preferred gold mix contains one-half micron gold flake and a gold resinate that dissociates upon firing into gold particles that range in size from 100–1000 A. The gold is fired at approximately the same temperature as the silver.

I have found that an overlay metal can be sintered onto a different material in a manner that gives a strong bond between the two, without having to resort to base metal oxide binders, glassy frits, etc. This is achieved by reacting the overlay metal, composed of a mixture of different particle sizes with the underlying material in a limited region around their mutual boundaries while the overlay metal simultaneously sinters to itself so as to form a contiguous and unadulterated upper layer. The relative rates of the reaction and of the sintering process are controlled by using the overlay metal in a form composed of a mixture of 0.5–1 micron size flakes and of an ultrafine powder as obtained from a chemical reaction, and whose particles range in size from 100–1000 angstroms. Control of the reaction rates permits the application of the overlay without the use of frits.

To make the material solderable, a final silver or gold concentration of at least 90 percent is necessary on the surface.

The bicomponent silver or gold composition used to facilitate solderability is usually fired at above 900° C, but only 800° C is needed when the palladium-zinc electrodes are freshly prepared before the silver is fired. When the palladium-zinc has aged and consequently oxidized on its surface, more than 900° C is needed to get the reaction of the silver with the palladium-zinc.

It can be said that the fritless overlay material should be fired at a temperature where a bond is formed between the electrode and the overlay material. Both the bonding and the sintering of the overlay material to itself proceed by solid state diffusion. This implies that the optimum firing temperature depends both on the particle size distribution of the overlay material and on the presence or absence of intervening oxide layers.

Other materials that can be used herein in addition to gold and silver as the overlay metal are platinum, and cadmium. It should be remembered that in order to obtain a good solderable surface, an unoxidized metal outer surface is needed thereon. A reduction of the oxygen pressure during part, or all, of the overlay-electrode cooling cycle can help to attain this. A distribution of "coarse" and "fine" particles within the metal will permit good adherence of the overlay to the electrode.

Figure 2:
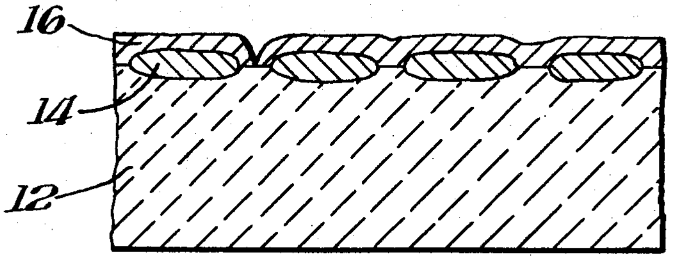
FIG. 2 shows a magnified sectional view of the bicomponent silver on the Pd-Zn layer before firing.

The silver overlay provides a solderable surface for the electrode herein, but this is not its sole purpose. After soldering or alloying, the overlay also provides a continuous metal covering that is sometimes lacking, because the palladium-zinc film is very thin and may become discontinuous. FIG. 2 illustrates the actual topography of the palladium-zinc. Upon firing the palladium-zinc may coagulate into little spheres 14, giving a barely discontinuous electrode "layer" over the ceramic substrate 12. The silver mixture 16 of the present invention is then screened, or otherwise applied, over this fired electrode.

Figure 3:
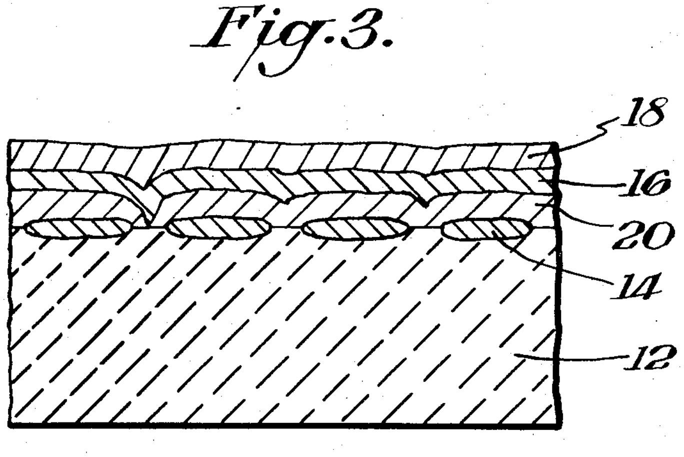
FIG. 3 shows a magnified sectional view of the silver coated electrode after firing, and having solder or an alloy applied thereon.

FIG. 3 illustrates what takes place upon firing after the silver overlay has been added. Silver 16 diffuses into the palladium-zinc 14, and palladium and zinc diffuse into the silver, so that a profile containing a wide range of silver to palladium and zinc concentrations is created, including a nearly pure silver layer 16 on top, a palladium, silver, and zinc region 20, and a region of almost silver free palladium-zinc 14 next to the ceramic substrate 12. Silver can reduce palladium compounds, so it is important for the purpose of retaining adhesion, that a region of silver free palladium-zinc is retained next to the ceramic; and it is also necessary to retain a high silver concentration at the outer surface in order to obtain good solder wettability of the electrode.

It is not necessary that the fired overlay electrode 16 be dense and of low lateral resistance because it has strength and wets with solder or easily alloys with another metal. The required low lateral resistance can be obtained from the metal that coats the overlay electrode, and glass frits need not be used in the application of the overlay material.

It should be noted again that an alternative to solder as a means for obtaining lead attachment on a low lateral resistance surface is the employment of other metals that alloy with the overlay metal. For example, the overlay may be alloyed with aluminum, antimony, bismuth, cadmium, gallium, germanium, indium, lead, silicon, mercury, tin, zinc and mixtures thereof. The resulting alloys give the necessary low resistances while serving as good bases for subsequent lead attachment, as long as they form a continuous layer on the electrode.

An example of utilizing an alloy for providing a low lateral resistance surface for the purposes of lead attachment would be alloying indium with a gold overlay. Indium powder or preform is screened, or otherwise applied, onto a gold layer that has been fired onto the ohmic contact electrodes as described within this invention. The indium is heated in any suitable manner to about 340° C, and thereby forms an alloy with the gold overlay giving a continuous layer of low lateral resistance.

Indium melts at 155° C and diffuses into the gold at a rapid rate.

When two gold coated parts are separated by a thin layer of indium, the indium will first liquify upon heating to 350° C, bringing the two parts into close contact and simultaneously diffuse into the gold. When the indium concentration drops below 55 percent as a result of the diffusion, solid intermetallic compounds are formed and the liquid phase disappears. This conveys to the bond considerable mechanical strength while the assembly is still hot, making it possible to sequentially assemble multiple chips, one on top of the other, with the lower chips securely fastened in place while the upper chips are being assembled at 350° C.

The other above-mentioned metals can be alloyed with the gold or silver overlay by applying them, and then heating the units to form an alloy thereon. The temperature required to form such an alloy will vary with the individual metal used, but should not exceed the melting point of the overlay metal.

Other devices, within the scope of the invention, that can utilize the silver or gold overlay as a basis for the solderable or alloyable surfaces set forth herein include the following:

I. A ceramic disc of barium titanate reduced in hydrogen at about 2400° F to impart semiconducting characteristics therein, having platinum-vanadium electrodes;

II. A ceramic disc of barium titanate fired in an oxidizing atmosphere so as to have dielectric properties, having palladium-tin electrodes;

III. A ceramic disc of barium titanate doped with niobium ($Nb_2O_5$) and fired to maturity, having palladium-nickel electrodes; and IV. A silicon die having a thin $SiO_2$ film thereon, having gold-chromium electrode.

Further materials that could be used as semiconducting or insulating substrates within the scope of this invention include, other titanates, alumina, and spinel.

Since it is obvious that many changes and modifications can be made in the above described details without departing from the nature and spirit of the invention, it is to be understood that the invention is not limited to said details except as set forth in the appended claims.

What is claimed is:

1. An electrical device comprising an inorganic substrate having an oxygen bearing surface and at least one electrode in ohmic contact with said surface, said electrode consisting essentially of an alloy of (1) a metal selected from the platinum group metals and mixtures thereof, and (2) a second metal being at least one metal selected from the group consisting of calcium, magnesium, strontium, barium, zinc, tin, vanadium, titanium, indium, nickel, and chromium, said electrode being oxidized in-situ with at least some of said oxygen bearing surface of said substrate.

2. The electrical device of claim 1 wherein said electrode is covered by an alloyed region of said electrode and a fritless metal selected from the group consisting of gold, silver, platinum and cadmium, and said alloyed region is covered by a region having said fritless metal in a concentration of at least 90 percent on its surface.

3. The electrical device of claim 2 wherein said fritless metal is gold.

4. The electrical device of claim 2 wherein said fritless metal is silver.

5. The electrical device of claim 2 having a continuous layer of solder over said fritless metal.

6. The electrical device of claim 1 having a continuous layer of an alloy over said fritless metal, said alloy consisting of said fritless metal and at least one metal selected from the group consisting of antimony, bismuth, cadmium, gallium, germanium, indium, lead, silver, mercury, tin, zinc, and mixtures thereof.

* * * * *